United States Patent [19]

Cathers

[11] 4,228,993
[45] Oct. 21, 1980

[54] SHEET ORIENTING AND TRANSPORTING FRAME

[75] Inventor: William P. Cathers, Allison Park, Pa.

[73] Assignee: PPG Industries, Inc., Pittsburgh, Pa.

[21] Appl. No.: 901,944

[22] Filed: May 1, 1978

[51] Int. Cl.$^2$ .................. B65H 9/06; B65H 29/24
[52] U.S. Cl. .................. 271/236; 198/486;
        271/195; 271/185; 294/65; 414/72; 414/104
[58] Field of Search .............. 271/194, 195, 236, 238,
        271/193, 184, 185, 84, 85, 245; 198/486, 689;
        414/70, 71, 72, 104, 107, 744; 294/65, 64 A, 64 B

[56] References Cited

U.S. PATENT DOCUMENTS

| | | | |
|---|---|---|---|
| 3,031,906 | 5/1962 | Holman | 414/71 X |
| 3,033,382 | 5/1962 | Noble et al. | 294/65 X |
| 3,151,904 | 10/1964 | Tantlinger et al. | 294/81 SF |
| 3,178,041 | 4/1965 | Wheat | 414/72 |
| 3,944,211 | 3/1976 | Rasmussen et al. | 271/245 X |
| 4,009,785 | 3/1977 | Trayes | 294/64 B X |

*Primary Examiner*—Bruce H. Stoner, Jr.
*Attorney, Agent, or Firm*—Donald Carl Lepiane

[57] ABSTRACT

A frame has (1) a pair of arms parallel to one another and normal to a third arm, each arm having a movable dog for orienting a sheet and (2) a plurality of arms each having cups through which a vacuum is pulled to secure the oriented sheet to the frame and through which pressurized fluid is moved to bias the sheet away from the frame.

15 Claims, 5 Drawing Figures

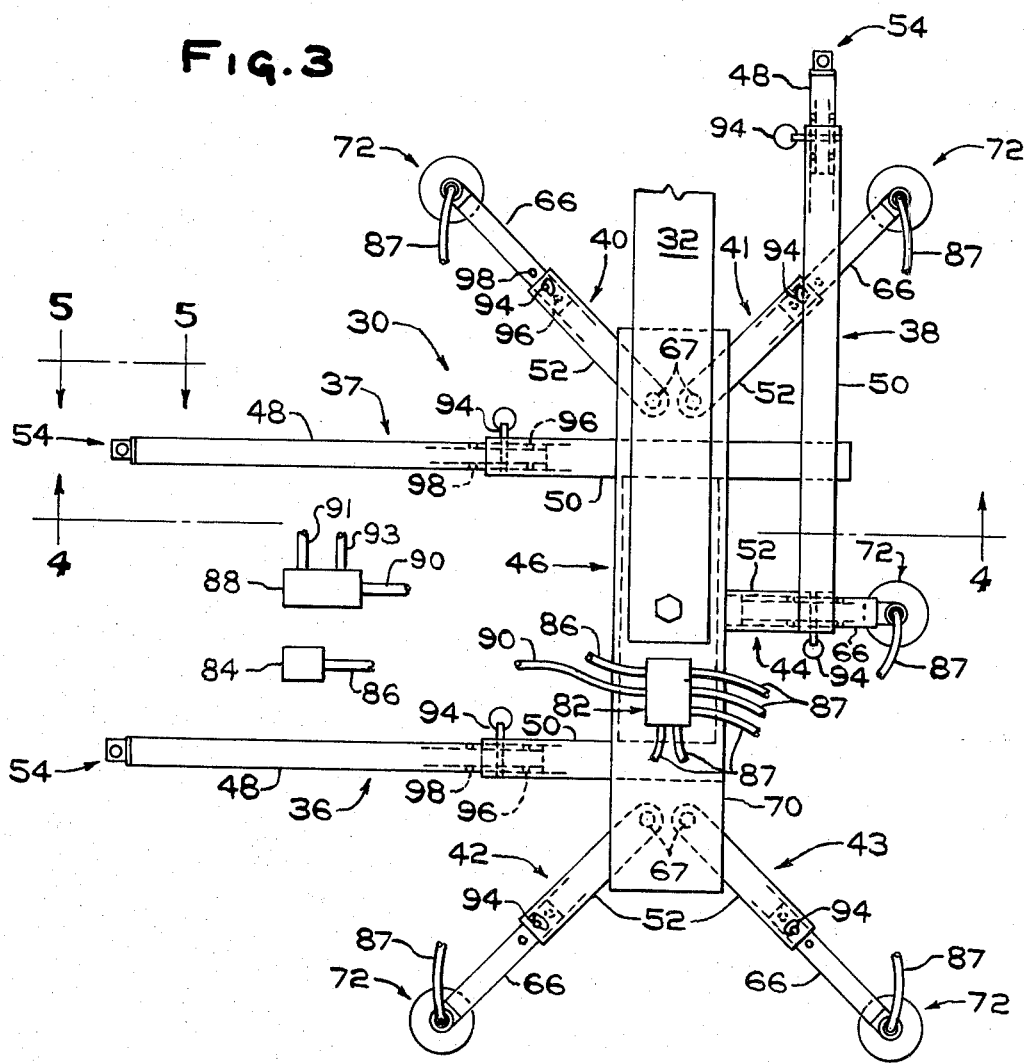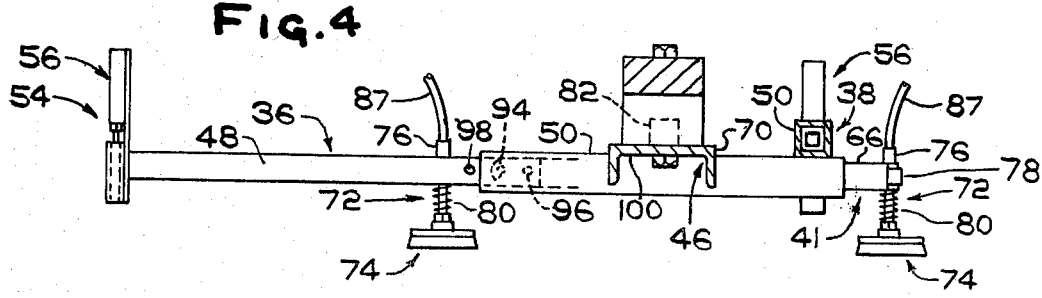

SHEET ORIENTING AND TRANSPORTING FRAME

BACKGROUND OF THE INVENTION

1. Field of the Invention

This invention relates to a sheet, for example, a glass sheet, orienting and transporting frame.

2. Discussion of the Prior Art and Technical Problems

In the prior art, for example, in

| U.S. Pat. Nos. | U. S. Pat. Nos. |
| --- | --- |
| 1,959,216 | 3,300,063 |
| 2,021,183 | 3,476,632 |
| 2,049,850 | 3,556,578 |
| 2,172,199 | 3,610,673 |
| 2,899,088 | 3,757,966 |
| 2,903,290 | 3,848,752 |
| 3,033,381 | 3,901,392 |
|  | 3,960,276 | there are taught frames and/or handling apparatuses for transporting material, e.g., sheets and/or rods. In general, the frame includes vacuum cups for securing the sheet to the frame for subsequent transfer from a conveyor or stack to a stack or conveyor, respectively. Although the frames taught in the prior art are acceptable for their intended purposes, they do not have facilities for orienting the sheet prior to transfer or transporting same. Therefore, when a sheet is transferred from a conveyor to a stack, the sheet must be oriented using additional equipment to have an aligned stack of sheets.

It would be advantageous, therefore, to provide a frame that is capable of both orienting and transferring or transporting sheet material.

SUMMARY OF THE INVENTION

This invention relates to a sheet orienting and transporting frame having a plurality of elongated members mounted in a plane with at least two of the elongated members having their longitudinal axis normal to one another. A dog mounts each of the at least two elongated members for movement away from the plane to orient the sheet and thereafter toward the plane to disengage the sheet. Facilities mounted on at least one of the plurality of elongated members secures the oriented sheet to the frame.

This invention also relates to a method of orienting and transporting a sheet, e.g., a glass sheet. The glass sheet is advanced along an article movement path into a first position. A frame is displaced in a first direction along a reciprocating path transverse and at an oblique angle to the article movement path to engage the edges of the sheet by orienting facilities mounted on the frame to orient the sheet. Thereafter the frame is displaced in a second opposite direction along the reciprocating path a predetermined distance to disengage the orienting facilities and the sheet, and thereafter the orienting facilities are moved away from the sheet. The frame is then displaced in the first direction the predetermined distance to position the frame over the sheet after which the sheet is secured to the frame. The sheet is then transferred from the first position to a second predetermined position.

BRIEF DESCRIPTION OF THE DRAWING

FIG. 3 is a view of the orienting and transporting frame incorporating features of the invention;

FIG. 4 is a view taken along lines 4—4 of FIG. 3; and

DESCRIPTION OF THE INVENTION

Figure 1:
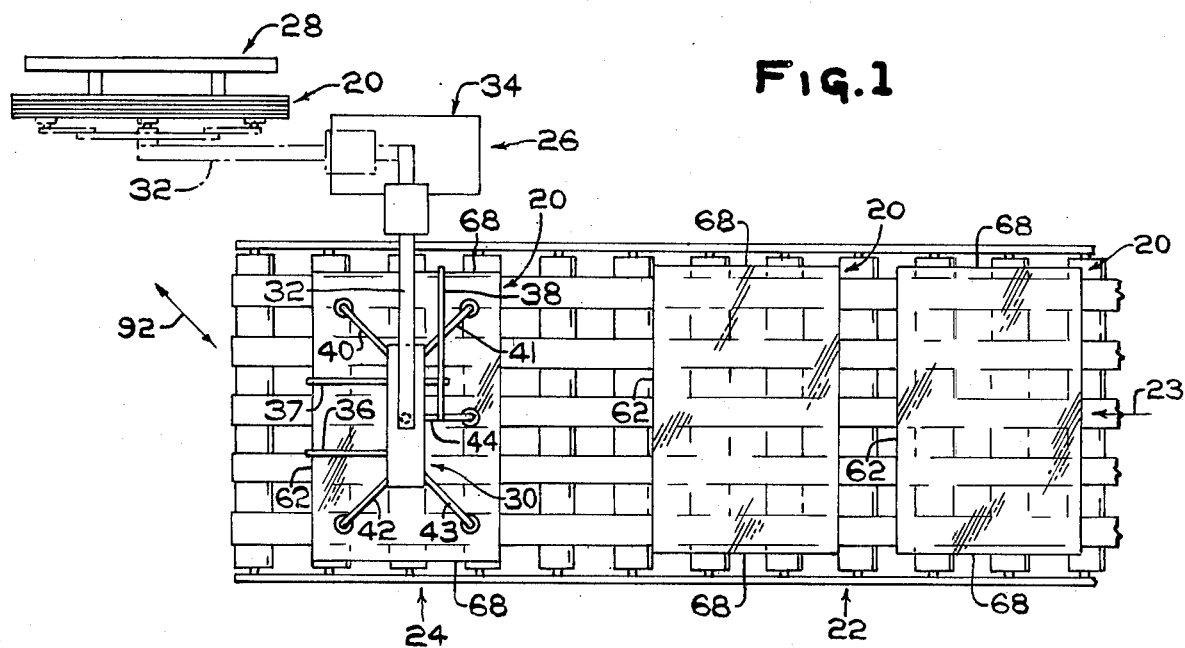
FIG. 1 is a top elevated view of a conveyor for moving sheets toward an unloading position where the sheets are oriented and transferred from the conveyor to a rack in accordance to the teachings of the invention.
Figure 2:
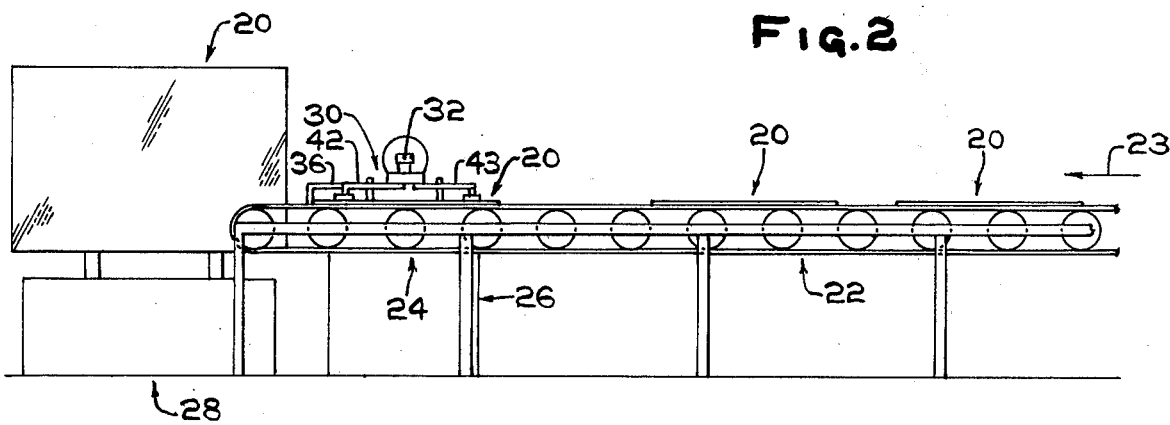
FIG. 2 is a side elevated view of the apparatus shown in FIG. 1.

With reference to FIGS. 1 and 2, sheets 20 are successively moved by belt conveyor 22 along an article movement path in the direction of arrow 23 into an unloading position 24 where the sheet is oriented and thereafter transported or transferred by apparatus 26 from the unload position 24 to rack 28 of the type used in the art where the sheets 20 are stacked. In the following discussion, the sheet acted on is a glass sheet; however, as will be appreciated, the invention is not limited thereto and may be practiced on other types of sheet material, e.g., wood, plastic, ceramic or metal sheets. The apparatus 26 includes frame 30 incorporating features of the invention mounted on arm 32 of industrial robot 34 of the type known in the art. The industrial robot 34 is programmed to move and operate the frame 30 to orient and thereafter transfer the sheet 20 in a manner to be discussed below.

As shown in FIG. 3, the frame 30 has a plurality of telescoping, orienting arms 36–38 and a plurality of telescoping, engaging arms 40–44 mounted relative to one another by plate member 46 secured to the robot arm 32. The orienting arms 36–38 are identical in construction and each include an extending arm section 48, slidable in receiving arm section 50. The receiving arm section 50 of the orienting arms 36 and 37 are mounted in spaced relation on the plate member 46 with their longitudinal axis parallel to one another. The arm section 50 of the orienting arm 38 is mounted on the receiving arm section 50 of the orienting arm 37 and receiving arm member 52 of the engaging member 44 as shown with the longitudinal axis of the orienting arm 38 perpendicular to the longitudinal axis of the orienting arms 36 and 37 as shown in FIG. 3. In this manner, the orienting arms 36–38 oriented the sheet 20 in the unloading position 24 in x,y coordinance.

Figure 5:
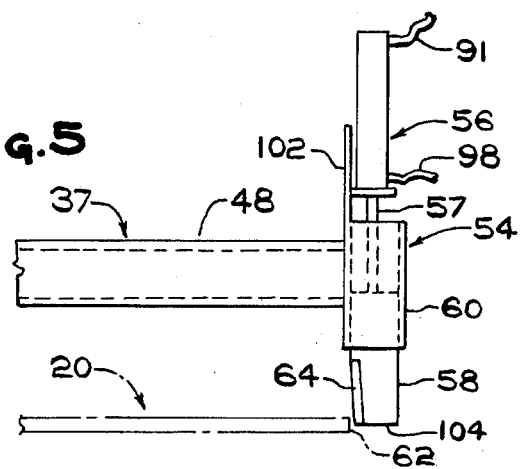
FIG. 5 is a view taken along lines 5—5 of FIG. 3.

With reference to FIGS. 3–5, a sheet engaging device 54 is mounted on the extending arm section 48 of the orienting arms 36–38. With specific reference to FIG. 5, the device 54 has a two-way cylinder 56 and a piston 57 for moving dog 58 out of guideway 60, i.e., to an engaging position, for engaging peripheral edge portions 62 of the sheet 20 during alignment thereof and into the guideway 60 to a non-engaging position prior to engagement of the oriented sheet 20 by the engaging arms 40–44. The dog 58 preferably has a non-abrading surface 64 to prevent edge damage to the sheet 20 during orientation. The arms 36–38 and/or arms 40–44 may be considered to lie in a plane and the dog moves away from the plane to the engaging position and toward the plane to the non-engaging position.

Referring back to FIG. 3, the engaging arms 40–44 are identical in construction and each have an extending arm member 66 slidable in receiving arm member 52.

The receiving arm member 52 of the engaging arms 40–43 are pivotally mounted at 67 to the plate member 46 to adjust the engaging arms 40–43 for different sheet sizes to minimize bending moments acting on the sheet during transfer thereof from the conveyor 22 to the rack 28. For example and with reference to FIG. 1, as the length of the sheet as measured between the sides 68 increases while the width remains constant, the angle subtended by the longitudinal axis of the pair of engaging arms 40, 41 and 42, 43 decreases and the length of the engaging arms 40–43 increases and vice versa. As the width of the sheet increases and the length remains constant, the angle subtended by the longitudinal axis of the pair of engaging arms 40, 41 and 42, 43 increases as does the length of the arms 40–43 and vice versa. The receiving arm member 52 of the engaging arm 44 secured to side 70 of the plate member 46 is used to engage bottom portion of the sheet as stacked to urge the sheet against the previously stacked sheets thereby assuring a compact stack.

With reference to FIGS. 3 and 4, an engaging device 72 mounted on the slidable arm member 66 of the engaging arms 40–44 has a suction cup 74 mounted on a hollow rod 76 (shown in FIG. 4). The hollow rod 76 is captured for slidable movement in bushing 78 mounted on slidable arm member 66 of the engaging arms 40–44. The cup 74 is biased away from its respective orienting arm 40–44 by a spring 80 mounted on the rod 76 between the bushing 78 and cup 74. A four-way valve 82 of the type used in the art is mounted on the plate member 46 and connected to a vacuum source 84 by line 86 to pull a vacuum through cups 74 by way of line 87 and hollow rod 76 to secure the sheet 20 to the frame 30, and the valve 82 is connected to a pressurized fluid supply 88 through line 90 to move a fluid, e.g., air, through the cups under pressure by way of line 87 and hollow rod 76 to move or bias the sheet away from the frame 30.

In practice and with reference to FIG. 1, the sheets 20 are displaced along the conveyor 22 toward the unload station 24. After a sheet has moved into the unload station 24, the conveyor is stopped, and the arm 32 of the robot 34 is moved toward the sheet 20 in the unload position. As the arm 32 moves toward the sheet, air is moved through from the supply 84 through line 91 (see FIGS. 3 and 5) to the cylinder 56 to move the piston 57 out of the cylinder 56 to move the dog 58 to the engaging position. Continual movement of the frame in a first direction along a reciprocating path (designated by the arrow 92 in FIG. 1) at an oblique angle to the article movement path orients the sheet in an x,y coordinate. After the frame has moved a predetermined distance to assure that the sheet is oriented, the frame is then moved along the path 92 in a second direction opposite to the first direction a predetermined distance to disengage the dogs from the edge portions of the sheet. Thereafter, air is moved from the supply 84 through line 93 (see FIGS. 3 and 5) to the cylinder 56 to move the piston 57 into the cylinder to move the dog 58 to the non-engaging position. The arm 32 is then moved along the path 92 in the first direction the predetermined distance after which the frame 30 is moved downward to urge the vacuum cups 74 against the sheet by the biasing action of the springs 80 as a vacuum is pulled through the line 86, valve 82 and line 87. The frame 30 is raised upward and moved away from the unload position toward the rack 28. After the frame 30 has cleared the conveyor 22, the frame 30 is rotated 90° and the sheet is loaded onto the rack 28. When the sheet is in position, the valve 82 is acted on to pass pressurized air from supply 88 to line 87, and through the cups 74 to urge the sheet against the previously stacked sheets. The robot arm 32 moves toward the unload position 24 to orient the next sheet moved into the unload position as the previous sheet was being acted on. As the arm 32 moves away from the rack, the rack is preferably indexed in any conventional manner so that a position for the next sheet is provided.

As can be appreciated, the orienting arms are preferably telescoped so that the orientation of the sheet can be accomplished and the frame after orientation is approximately in the center of the sheet. In this manner, when the sheet is engaged by the engaging arms, the weight of the sheet will be equally distributed to each cup thereby minimizing the bending moments. Further, as can be appreciated, the frame (1) may be used with only two orienting arms having their longitudinal axis normal to one another; (2) may be used without the engaging arm 44 and (3) with the engaging arms 40–43 secured against pivotal movement. Other modifications may be made to the frame of the instant invention without deviating from the concept.

DETAILED DESCRIPTION OF THE INVENTION

The orienting and transporting frame 30 of the instant invention is used with an industrial robot 34 sold by Cincinnati Milacron of Cincinnati, Ohio, Model 6CH, to orient and transfer glass sheets 20 from belt conveyor 22 to rack 28 of the type used in the art. In the following discussion, unless indicated otherwise, the receiving arm sections 50 and members 52 of the orienting arms 36–38 and engaging arms 40–40, respectively, are made of square aluminum tubing having a wall thickness of about 0.13 inch (0.33 centimeters) and about 2 inches (5.08 centimeters) outer sides. The extending arm section 48 and member 66 of the telescoping orienting arms 36–38 and engaging arms 40–44, respectively, are made of square aluminum tubing having a wall thickness of about 0.125 inch (0.3175 centimeter) and about 1.75 inches (4.45 centimeters) outer sides. The extending arm sections or members and receiving arm sections or members are adjusted in length by a pin 94 passing through aligned ones of holes 96 and 98.

With reference to FIG. 3, the receiving arm sections 50 of orienting arms 36 and 37 are mounted on plate member 46 made of aluminum channel 6 inch (15.24 centimeters) at 3.62 pounds (1.65 kilograms) having a length of about 34 inches (86.36 centimeters). The receivable arm sections 50 of the orienting arms 36 and 37 are mounted at center-to-center spacing of about 20 inches (10.8 centimeters) on the bottom surface 100 of the plate member 46 (see FIG. 4). The length of the receiving arm section 50 of the orienting arm 36 is about 13 inches (33.02 centimeters); of the orienting arm section 37 is about 20 inches (10.8 centimeters) and extends about 7 inches (17.78 centimeters) beyond side 70 of the plate member 46; and of the orienting arm 38 is about 21 inches (53.34 centimeters). The receiving arm section 50 of the orienting arm 38 is supported on the receiving arm section 50 and 52 of the orienting arm 37 and engaging arm 44, respectively, as shown in FIG. 3. The extending arm section 48 of the orienting arms 36–38 each have a length of about 17 inches (43.18 centimeters). The orienting arm 38 is on a center-to-center spacing of about 8 inches (20.32 centimeters) with the plate member 46 and has its longitudinal axis normal to the longitudinal axis of the orienting arm 37. An aluminum plate 102 about 2 inches (5.08 centimeters) wide and about ⅛ inch (0.32 centimeter) thick is mounted on the end of each extending arm section 48 for supporting a guideway 60 made of about ⅛ inch (0.32 centimeter) thick, about 1¼ inch (3.175 centimeters) wide square aluminum tubing and a two-way cylinder 56 of the type sold by Bimba Company having a ¾ inch (1.9 centimeters) base, Model No. 042-NR, as shown in FIG. 5. A dog 58 mounted on piston 57 of the cylinder 56 has about a 2 inch (5.08 centimeters) by about 1 inch (2.54 centimeters) by about ¾ inch (1.9 centimeters) strip of synthetic resin polymer known as TEFLON® mounted on an aluminum block so that the dog 58 has a length of about 3.5 inches (8.89 centimeters) and sides of about 1 inch (2.54 centimeters). The piston stroke is 2 inches (5.08 centimeters) and the cylinder 56 mounted on the respective plate 102 such that the dog 58 in the extended position has surface 104 (see FIG. 5) about 1 inch below the plane of the cups 74 (see FIG. 4) of the engaging arms 40–44 to be discussed below.

Referring back to FIG. 3, the receiving arm member 52 of the engaging arms 40–43 each having a length of about 10 inches (25.4 centimeters) are pivotally mounted at 68 on the undersurface 100 of the plate member 46 by a nut, bolt and bushing assembly, and the slidable arm member 66 of the engaging arms 40–43 has a length of about 9.5 inches (24.13 centimeters). An engaging device 72 mounted adjacent the end of the slidable arm member 66 has a hollow rod about 6 inches (15.24 centimeters) long having an outside diameter of about ⅝ inch (1.59 centimeters) and a wall thickness of about 5/32 inch (0.40 centimeters) captured for slidable movement in ball bushing 78 mounted in any conventional manner on the end of the engaging arm. Approximately a 4 inch diameter (10.16 centimeters) suction cup 74 of the type used in the art is mounted on the end of the hollow rod and biased away from its respective arm by spring 80 as shown in FIG. 4. A four-way valve 82 of the type sold by Numatics, Incorporated of Highland, Michigan, is mounted on the plate member 46 connected by way of line 86 to a vacuum supply 84; by way of line 90 to a pressurized air supply 88 and by way of lines 87 to each of the hollow racks 76 of the engaging devices 72.

With reference to FIG. 3, the engaging arm 44 having about a 6 inch (15.24 centimeters) long receiving arm member 52 is mounted on the side 70 of the plate member 46 with its longitudinal axis coincident with lateral center line of the plate 46. The extending arm member 66 of the orienting arm 44 has a length of about 7.5 inches (19.05 centimeters).

With specific reference to FIG. 3, engaging arms 40 and 41 have their pivot points spaced about 13 inches (33.02 centimeters) from the lateral centerline; on a center-to-center spacing between each other of about 2.25 inches (5.7 centimeters) and spaced about 1⅞ inch (4.76 centimeters) from adjacent plate side. The engaging arms 42 and 43 are similarly mounted on the opposite end of the plate member 46.

Sheets 22 having a length of about 76 inches (1.93 meters) as measured between their sides 68 (see FIG. 1) and a width of about 34 inches (86.36 centimeters) and a thickness of about 7/32 inch (0.56 centimeter) are moved along the belt conveyor 22 into the unloading station 24. The orienting arms 36 and 37 of the frame are adjusted to have a length of about 17 inches (43.18 centimeters) as measured between the plate 64 of the dog 58 and center line of the plate member 46 and the orienting arm 38 has a length of about 38 inches (0.97 meter) measured between the plate 64 of the dog 58 and center line of the plate member 46. The engaging arms 40, 41, 42 and 43 are set with their longitudinal axis subtending an oblique angle of about 45° with the arms 40–44 fully extended.

After a sheet has moved into the unloading position 24, the arm 32 of the robot 34 moves the frame 30 toward the sheet as air from the supply 84 is moved through line 91 in any conventional manner to the cylinder 56 to move the piston 57 out of the cylinder 56 to move the dogs 58 to the engaging position, i.e., about 1 inch (2.54 centimeters) below the plane of the cups 74. As the arm moves toward the sheet along a reciprocating path 92 generally oblique to the glass movement path (see FIG. 1), the dogs engage the peripheral edge portions of the sheet to orient same. After the sheet is oriented, the robot arm 32 and frame 30 are displaced about 1 inch (2.54 centimeters) away from the sheet oriented along path 92 to disengage the dogs 64 from the edge portions of the oriented sheet. Thereafter, air is moved from the supply 84 along line 93 in any conventional manner to the cylinder 56 to withdraw piston 57 to move the dogs into their respective guideway 60 to the non-engaging position above the plane of the vacuum cups. The frame 30 is thereafter moved 1 inch (2.54 centimeters) along the path 92 toward the sheet and then moved toward the glass to move the vacuum cups 74 into engagement with the glass. The cups are urged toward the glass by the biasing action of the springs 80 as a vacuum is pulled by supply 84 through line 86; four-way valve 82; lines 87 and rods 76. The frame having the sheet is moved by the robot arm 32 toward the rack 28. As the sheet clears the conveyor, the arm is rotated 90° and the sheet is mounted on the rack 28. The four-way valve 82 is acted on to shut off vacuum through lines 87 and move pressurized air from supply 88 through the cups to urge the sheet against the rack or previously stacked sheets. As the sheet is being loaded, the conveyor 22 is engaged to move the next sheet into the unload position 24. The above cycle is repeated to load the remaining sheets on the rack.

As can be appreciated, the above example is merely illustrative of the invention and is not limiting to the invention.

What is claimed is:

1. Sheet orienting and transporting apparatus for transferring a sheet from a sheet supply position to a predetermined sheet receiving position, comprising:

a pair of sheet orienting members;

means for maintaining said pair of sheet orienting members in predetermined spaced relationship to one another to define orienting axes;

means for moving said pair of sheet orienting members along a first reciprocating path towards said sheet supply position into a sheet engaging and orienting position and away from said sheet supply position toward a sheet non-engaging position;

means for displacing said maintaining means in a sheet orienting direction along a second reciprocating path from a remote position to the sheet supply position and for moving said maintaining means in a non-orienting direction along the second reciprocating path subsequent to orientation of said sheet, said second reciprocating path being transverse to said first reciprocating path; and means mounted on said maintaining means for engaging an oriented sheet to said maintaining means for movement therewith subsequent to movement of said maintaining means in said orienting and non-orienting directions, said means for displacing said orienting members moving said maintaining means and said sheet from said sheet supply position to said predetermined sheet receiving position.

2. The apparatus as set forth in claim 1 wherein said means for moving said pair of sheet orienting members includes:

a guideway defining the first reciprocating path and having one of said sheet orienting members mounted in said guideway; and a cylinder and piston assembly having its piston mounted to said one of said sheet orienting members to move said one of said sheet orienting members along the first linear reciprocating path.

3. The apparatus as set forth in claim 1 wherein said maintaining means includes:

a plate member; and said sheet engaging means includes a plurality of elongated members pivotally mounted on said plate member in spaced relationship to one another.

4. The apparatus as set forth in claim 3 wherein said engaging means further includes:

a respective cup mounted on each of said plurality of elongated members;

means for pulling a vacuum through each said cup; and means for moving fluid under pressure through each said cup against the sheet.

5. The apparatus as set forth in claim 4 wherein said engaging means further includes means for biasing said cups away from their respective elongated member.

6. The apparatus as set forth in claim 1 wherein said maintaining means include at least two elongated members each having a longitudinal axis with the longitudinal axes perpendicular to one another and:

said means for moving said pair of sheet orienting members mounted on said at least two elongated members.

7. The apparatus as set forth in claim 3 or 6 wherein selected ones of said elongated members are telescoping members.

8. The apparatus as set forth in claim 7 wherein said pair of sheet orienting members each has a sheet engaging surface of low abrasive material.

9. A method of orienting and transporting a sheet, comprising the steps of:

advancing the sheet along an article movement path into a first position;

displacing a frame in a first direction along a reciprocating path relative to the sheet to engage the edges of the sheet by orienting means mounted on the frame to orient the sheet at the first position;

displacing the frame in a second opposite direction along the reciprocating path a predetermined distance to disengage the orienting means and the edges of the oriented sheet;

displacing the orienting means away from the sheet;

displacing the frame in the first direction along the reciprocating path the predetermined distance;

securing the oriented sheet to the frame; and transferring the sheet from the first position to a second predetermined position.

10. The method as set forth in claim 9 wherein the oriented sheet is engaged by vacuum means and further includes:

directing fluid under positive pressure against the sheet to disengage the sheet from the vacuum means.

11. The method as set forth in claim 7 wherein the sheet is a glass sheet.

12. The method as set forth in claim 11 wherein the sheet is loaded on a rack at the second predetermined position.

13. The method as set forth in claim 9 wherein the orienting means are moved along a reciprocating linear path and moved in a first direction along the path to move the aligning means away from the sheet.

14. The method as set forth in claim 9 wherein the frame is displaced in a first direction along a reciprocating path transverse and at an oblique angle to the article movement path.

15. The apparatus as set forth in claim 1 wherein said displacing means includes said means for moving said maintaining means.

* * * * *